US006657341B2

United States Patent
Trionfetti

(10) Patent No.: US 6,657,341 B2
(45) Date of Patent: Dec. 2, 2003

(54) DEVICE FOR AXIAL STOPPING OF A ROTOR, IN PARTICULAR AN ARMATURE OF AN ELECTRIC MOTOR, FOR BALANCING MACHINES

(75) Inventor: Gianni Trionfetti, Agrate Brianza (IT)

(73) Assignee: Balance Systems S.p.A., Milan (IT)

( * ) Notice: Subject to any disclaimer, the term of this patent is extended or adjusted under 35 U.S.C. 154(b) by 0 days.

(21) Appl. No.: 09/910,867

(22) Filed: Jul. 24, 2001

(65) Prior Publication Data

US 2002/0014803 A1 Feb. 7, 2002

(30) Foreign Application Priority Data

Jul. 25, 2000 (IT) .................................... MI2000A1693

(51) Int. Cl.[7] .................................................. H02K 7/08
(52) U.S. Cl. ............................. 310/90; 310/51; 310/91; 384/121
(58) Field of Search ................................ 384/100, 121; 310/51, 90, 90.5, 91

(56) References Cited

U.S. PATENT DOCUMENTS

| 3,177,493 | A | * | 4/1965 | Durlofsky | .................... 360/234 |
| 3,813,133 | A | * | 5/1974 | Walter et al. | ................ 384/121 |
| 5,098,205 | A | * | 3/1992 | Zehndbauer et al. | ........ 384/124 |
| 5,450,718 | A | * | 9/1995 | Knabel et al. | .............. 384/112 |
| 5,855,110 | A | * | 1/1999 | Bock et al. | .................. 116/208 |

FOREIGN PATENT DOCUMENTS

DE 3710962 * 10/1987 .......... D01H/1/244

* cited by examiner

*Primary Examiner*—Burton Mullins
(74) *Attorney, Agent, or Firm*—Browdy and Neimark, P.L.L.C.

(57) ABSTRACT

It is disclosed a device for axial stopping of a rotor, in particular an armature of an electric motor, for balancing machines, the device comprising a thrust unit having an abutment surface (8) adjacent to an end face (4b) of the support shaft (4) of the rotor (5) and adapted to exert on the end face (4b), a repulsive force which is able to keep an interstice (1a) between the abutment surface (8) and the end face (4b), the thrust unit comprising fluid-emitting means (9) suitable to form a layer of fluid between the abutment surface (8) and the end face (4b).

6 Claims, 2 Drawing Sheets

DEVICE FOR AXIAL STOPPING OF A ROTOR, IN PARTICULAR AN ARMATURE OF AN ELECTRIC MOTOR, FOR BALANCING MACHINES

FIELD OF THE INVENTION

The invention relates to a device for axial stopping of a rotor. The device is provided for balancing machines capable of detecting unbalances in rotors occurring when the rotors themselves are driven in rotation.

The concerned rotors are preferably the armatures of electric motors used in micromotors or electric tools, or the armatures of electric motors of small and big household electrical appliances, electric motors employed in the automotive sector, etc.

DESCRIPTION OF THE PRIOR ART

It is known that rotors of electric motors are mounted on support shafts defining the rotation axis of said rotors and once mounted must be carefully measured and balanced, in order to prevent vibrations and unbalanced stresses to be generated in use, during rotation of said rotors, at a high number of revolutions per seconds.

The balancing machines carrying out measurement of these rotors or armatures comprise elements intended for support and control of the radial loads, and axial-abutment elements.

The elements intended for support and control of the radial loads, i.e. loads directed in a direction perpendicular to the rotation axis are generally fork-shaped elements supporting said shafts and connected to sensor devices capable of detecting and measuring the amount of possible unbalances, when a rotatory motion is imposed to the rotors.

The axial-abutment elements are on the contrary designed to abut against the opposite end faces of the rotor shafts, to hold them in an axial direction, while the rotatory motion necessary to detect and measure the unbalances to which the rotors are subjected is being transmitted to the rotors.

Practically in the known art the axial-abutment elements are generally made up of a pair of elastic foils held contact, at their substantially flat portions, with said end faces, against which they slide during the rotatory motion of the rotors.

It should be pointed out that in balancing machines the rotatory motion is transmitted to the rotors through belts of a material having a high friction coefficient the belts being in contact with the outer surface of the rotors themselves when their support shafts are caused to rest on said fork-shaped support elements.

To avoid occurrence of axial oscillations, during the rotor rotations, between the abutment elements defined by said elastic foils, the rotors are such disposed that their rotation axis is not perfectly perpendicular to said rotation-controlling belts.

In fact a slightly inclined orientation of the rotors relative to said belts is generally provided so that the belts may generate dragging forces on the rotors having a small component directed towards one of the two axial-abutment elements. Consequently, each rotor is pushed with a reduced force in one way alone of its axial direction and only one of the two axial-abutment elements must react to the action exerted by the corresponding end face of the shaft. The other axial-abutment element exclusively performs a safety function, but practically is not submitted to any stress.

In this manner, a good stability of the axial position of the rotors is obtained. The known art briefly described above is satisfactory in many cases, but it has the drawback that sometimes it is not adapted to reach the highest reliability qualities required by the most severe standards concerning balancing machines. In particular, the requirement of a great precision is felt, in order to achieve repeatability and reliability in measures or "capability", in the cases in which for example it is provided that measures repeated a great number of times on the same rotor or armature might differ by ten per cent at the most from each other with respect to the proper tolerance value of the balancing machines which is already very small by itself.

From experimental tests it came out that unevennesses in the measurement results of rotor unbalances arise at least partly at the axial abutment elements used in the known art to axially retain the rotors, and that unbalances depend on the finish degree of the ends of the rotor-supporting shafts.

In fact, the end faces of the rotor supporting shafts have an imperfect perpendicularity relative to the rotation axis and this imperfect perpendicularity gives rise, on sliding against the axial-abutment elements i.e. the elastic foils, to additional vibrations that adversely affect the whole rotor thereby modifying detection from the balancing machines.

The above mentioned additional vibrations can also result from geometric and/or positioning defects between the support shafts and the axial-abutment elements. Practically, it was found out that due to small imperfections at the axial-abutment elements, vibrations are generated that are interpreted as unbalance signals, which unbalances do not in fact exist.

In order to overcome the above mentioned drawback, a reduction in the perpendicularity error of the end faces of the rotor-supporting shafts cannot be in any case envisaged, nor can a raising of the working level of the shafts be conceived.

In fact this technical solution would involve a heavy rise in the production costs of the rotors in a portion thereof that is not of great importance as regards operation. In addition this technical solution would not enable complete cancellation of the influence exerted by said vibrations on the unbalance measure, due to contact of said end faces against the axial-abutment elements.

SUMMARY OF THE INVENTION

Under this situation the technical task underlying the invention is to conceive a device for axial stopping of rotor balancing machines capable of substantially obviating the mentioned drawbacks.

Within the scope of this technical task, it is an important aim of the invention to provide an axial-stopping device capable of preventing that, in measurements, other periodic unevennesses resulting from axial engagement of the support shaft with the axial-abutment elements should be added to unbalances typical of rotors.

The technical task mentioned and the aims specified are achieved by a device for axial stopping of a rotor, in particular an armature of an electric motor, for balancing machines, said rotor having a support shaft defining a rotation axis and two end faces transverse to said rotation axis, said device comprising at least one thrust unit having an abutment surface adjacent to one of said end face and adapted to exert a repulsive force on said end face able to axially stop said support shaft and to keep an interstice between said abutment surface and said end face of said support shaft.

BRIEF DESCRIPTION OF THE DRAWINGS

Description of a preferred embodiment of an axial-stopping device in accordance with the invention is given hereinafter by way of non-limiting example, with the aid of the accompanying drawings, in which.

DESCRIPTION OF THE PREFERRED EMBODIMENT

Figure 1:
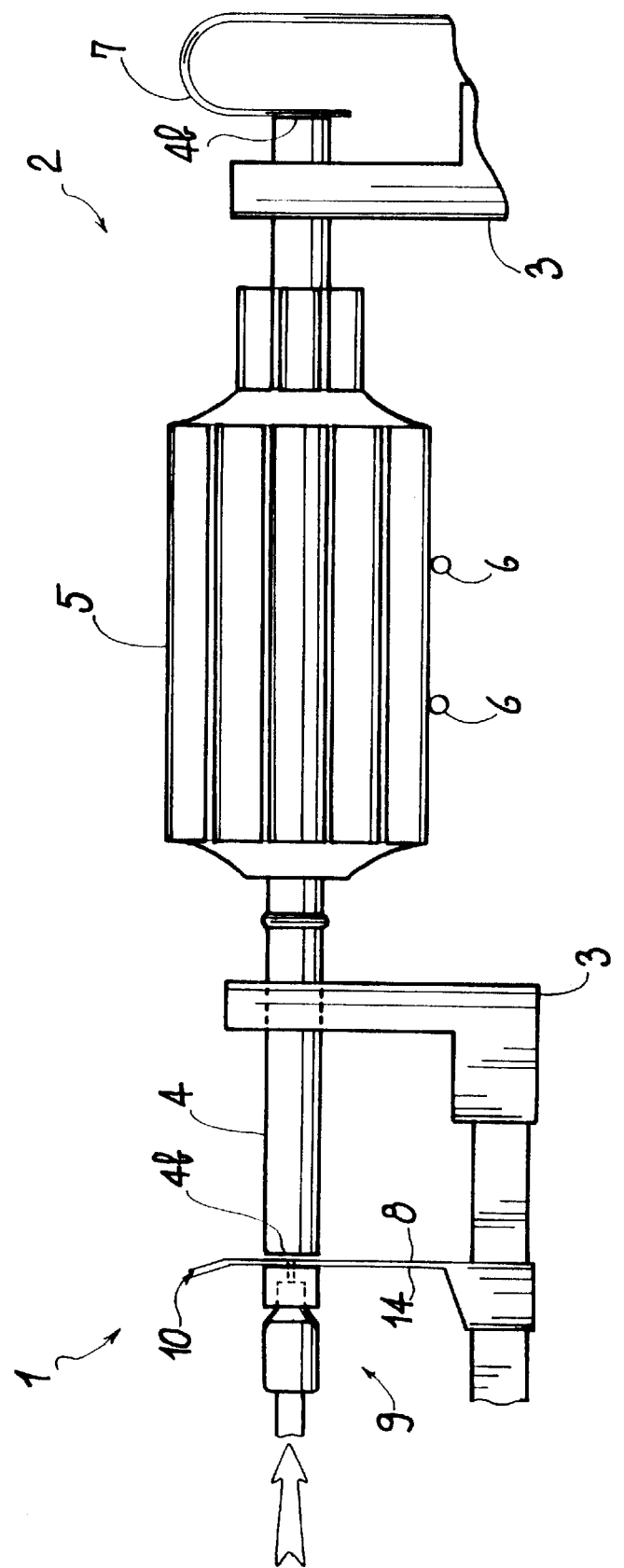
FIG. 1 is a diagrammatic elevation front view of a balancing apparatus provided with a device in accordance with the invention.

With reference to the drawings, the axial-stopping device in accordance with the invention is generally identified by reference numeral 1.

It is applied to a rotor-balancing machine, known by itself, denoted at 2.

The balancing machine is provided with a pair of substantially fork shaped support elements 3 on which a support shaft 4 of a rotor 5 is caused to rest; said rotor may be an armature of an electric motor for example, the unbalances of which within the admitted tolerances are wished to be measured and subsequently reduced. Practically, the support elements 3 are capable of oscillating and connected to sensor devices capable of detecting the unbalance amounts in order to carry out correction of said unbalances. The support shaft 4 defines a rotation axis 4a and terminally has two end faces 4b substantially parallel to each other and perpendicular to the rotation axis 4a.

Figure 2:
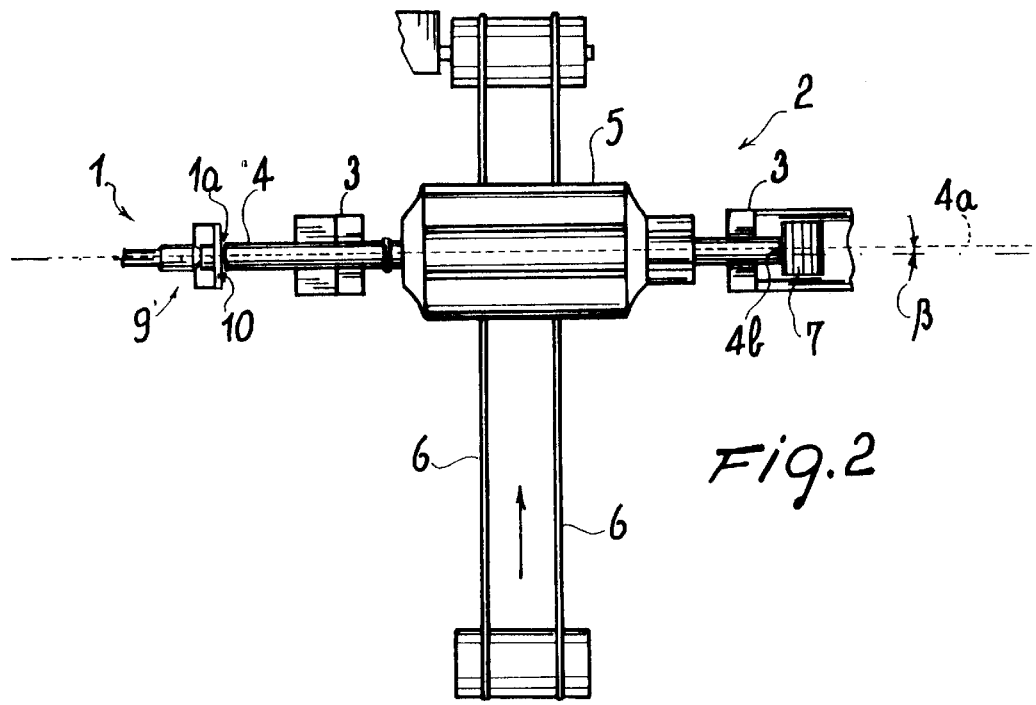
FIG. 2 is a plan view of FIG. 1.
Figure 3:
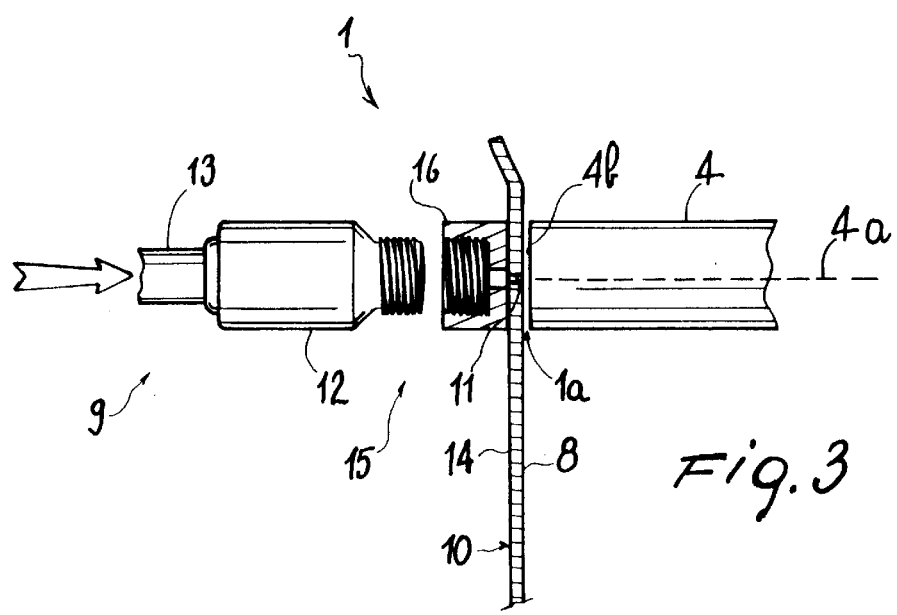
FIG. 3 is an enlarged side section of the axial-stopping device.

The balancing machine 2 also comprises actuating means for carrying out the rotatory motion of the rotor or armature 5. In FIGS. 1 and 2 these means comprise two driving belts 6 that are in contact with the outer surface of the rotor 5 when the related support shaft 4 is positioned on the support elements 3.

The driving belts 6 and therefore the dragging forces generated by said belts on the rotor 5 do not form a right angle relative to the rotation axis 4a but they are slightly inclined with respect to a plane perpendicular to said axis by a small angle β, so that they tend to push the rotor 5 towards the stopping device 1 with a reduced force.

At the opposite end from the one where the device 1 is located, preferably a safety axial-abutment element 7 is provided, said element being of a known type and at all events normally not designed to come into contact with the end face 4b adjacent thereto.

The stopping device 1 comprises at least one thrust unit having an abutment surface 8 disposed in front of a corresponding end face 4b of the support shaft 4.

The thrust unit 1 is adapted to exert a repulsive force capable of axially stopping the support shaft 4 in the vicinity of the abutment surface 8 while keeping an interstice 1a between the latter and the end face 4b close thereto, so as to avoid direct contacts therebetween.

The thrust unit 1 in fact comprises fluid emitting means 9, the fluid being air, water or oil.

In particular, fluid is defined by compressed air adapted to form a gap or a cushion of air under pressure interposed between the abutment surface 8 and the adjacent end face 4b of the support shaft 4.

Said air gap generates the repulsive force and constitutes an interstice 1a of some tenth of a millimeter sufficient to avoid direct contact between the abutment surface 8 of the thrust unit 1 and the end face 4b of the shaft 4 even if the latter has surface unevennesses or perpendicularity errors relative to the rotation axis.

In more detail, the thrust unit 1 comprises an abutment element 10 made of a spring steel foil element for example of a thickness in the order of one millimeter defining, on a first face thereof, the abutment surface 8 disposed in front of the end face 4b of the support shaft 4. At least one hole 11 is formed in the abutment element 10 and when the abutment element is made up of said foil element, it consists of a through hole coaxial with the rotation axis 4a of shaft 4.

The fluid-emitting means 9 comprises an attachment sleeve 12 and a feeding pipe 13 engageable with a second face 14 of the foil element 10, at the through hole 11.

Also provided are attachment members 15 for the fluid-emitting means 9 said members being made up of a connection member 16 which is welded to the foil element and with which the sleeve 12 engages by screwing.

Based on tests carried out by the Applicant, the axial-stopping device 1 is able not only to stop the support shaft 4 of the rotor 5 at a short distance from its abutment surface 8, but also to initially attract the shaft 4 itself not yet driven in rotation, towards said abutment surface.

In fact, a sort of sucking action takes place which is due to the weak negative pressure that, based on known hydrodynamics laws, is generated in the air flow coming out of the through hole 11 and forced to enter the gap included between the end face 4b of shaft 4 and the abutment surface 8. Practically, the end face 4b of the support shaft is retained during rotation of the latter to a fixed and constant distance, thereby avoiding even minimum axial oscillations.

The invention achieves important advantages.

In fact, the axial-stopping device in accordance with the invention, by eliminating any contact between the end faces 4b of the rotor shaft 4 and solid surfaces, also enables the vibrations produced by said contact to be cancelled.

Therefore, unbalances typical of each rotor and measured by the apparatus are not at all affected by periodic unevennesses produced by axial stopping, as it generally happens in the known art, and consequently the rotor unbalances can be evaluated in a more precise and reliable manner.

It will be finally recognized that the device in accordance with the invention can be easily inserted in balancing machines of known type, replacing one or both of the conventional axial abutment elements of known balancing machines, in particular the axial abutment element against which the rotor to be balanced tends to be pushed by the means 6 controlling its rotation.

The device can obviously be used for operation on rotors of any type when said rotors are mounted on balancing machines. The repulsive force capable of axially stopping the support shaft 4 and maintaining an interstice 1a at the end face 4b can be embodied either by a fluid such as air, water or oil, or by a magnetic element mounted on the abutment element 10, or by the abutment element itself duly magnetized. In the last-mentioned case the support shaft 4 must be magnetized as well at its end face 4b or said face must be associated with a magnetic element of the same polarity as that of the abutment surface 8. The identical polarities, by repelling themselves, balance the thrust exerted by the means controlling rotation of the rotor.

A single thrust unit is generally provided at one end of shaft 4, since shaft 4 is held in place by the means 6 controlling its rotation. It is however possible for said rotation controlling means to have a neutral action, in which case a stabilizing action on the shaft is exerted by another thrust unit.

What is claimed is:

1. A device for axial stopping of a rotor, in particular a rotor of an electric motor, said rotor (5) having a support shaft (4) defining a rotation axis (4a) and two end faces (4b) transverse to said rotation axis (4a), the device comprising at least one thrust unit for exerting a repulsive force on at least one of said end faces (4b) to axially stop said support shaft (4), said at least one thrust unit comprising:

an abutment element (10) defining an abutment surface (8) adjacent to said at least one of said end faces (4b), fluid-emitting means (9) for forming a layer of fluid between said abutment surface (8) and said at least one of said end faces (4b), said layer of fluid maintaining an interstice (1a) between said abutment surface (8) and said at least one of said end faces (4b) and exerting said repulsive force, wherein said abutment element (10) comprises a foil element having at least one through hole (11) for passage of said fluid.

2. A device as claimed in claim 1, wherein said fluid-emitting means comprise a connection member (16) fastened to said foil element and a fluid-feeding pipe (13) removably connectable with said connection member (16), said connection member (16) having at least one through passage in communication with said at least one through hole (11).

3. A device as claimed in claim 2, wherein said connection member (16) is arranged on a side of said foil element opposite to said at least one of said end faces (4b), and wherein said at least one through passage is coaxial with said at least one through hole (11).

4. A device as claimed in claim 1, wherein said fluid-emitting means (9) comprise means for feeding air under pressure.

5. A balancing machine for a rotor, said rotor having a support shaft (4) defining a rotation axis (4a) and two end faces (4b) transverse to said rotation axis (4a), the machine comprising:

means (3) for rotatably supporting said shaft (4), means (6) for rotating said rotor (5) with said shaft (4), and a device (1) for axial stopping of said rotor (5), said device comprising at least one thrust unit for exerting a repulsive force on at least one of said end faces (4b) to axially stop said shaft (4), said at least one thrust unit comprising:

an abutment element (10) defining an abutment surface (8) adjacent to said at least one of said end faces (4b), and fluid-emitting means (9) for forming a layer of fluid, and maintaining an interstice (1a), between said abutment surface (8) and said at least one of said end faces (4b), said layer of fluid generating said repulsive force, wherein said abutment element (10) comprises a foil element having at least one through hole (11) in communication with said fluid-emitting means (9) for forming said layer of fluid and maintaining said interstice (1a).

6. A machine as claimed in claim 5, wherein said fluid emitting means (9) comprise a connection member (16) fastened to said foil element and a fluid-feeding pipe (13) removably connected with said connection member (16), said connection member (16) having at least one through passage in communication with said at least one through hole (11).

* * * * *